United States Patent

[11] 3,588,357

[72] Inventor Daniele Sellari, Jr. Corinth, Miss.

[21] Appl. No. 834,842

[22] Filed June 19, 1969

[45] Patented June 28, 1971

[73] Assignee International Telephone and Telegraph Corporation New York, N.Y.

[54] AUTOMATIC REMOTE METER READING OVER TELEPHONE LINE

8 Claims, 2 Drawing Figs.

[52] U.S. Cl. .......... 179/2, 340/150, 340/163

[51] Int. Cl. .......... H04m 11/00

[50] Field of Search .......... 179/2 (R), 2 (DP), 2 (TC), 2 (A); 340/150, 163

[56] References Cited

UNITED STATES PATENTS

| | | | |
|---|---|---|---|
| 1,933,996 | 11/1933 | Paris .......... | 179/2X(A) |
| 3,231,670 | 1/1966 | Lane .......... | 179/2(A) |
| 3,352,971 | 11/1967 | Nilsson .......... | 179/2(A) |
| 3,449,739 | 6/1963 | Simmons .......... | 340/150X |

*Primary Examiner*—Ralph D. Blakeslee

*Attorneys*—C. Cornell Remsen, Jr., Walter J. Baum, Percy P. Lantzy, J. Warren Whitesel, Delbert P. Warner and James B. Raden

ABSTRACT: Equipment at a subscriber station times out every four weeks, depending upon design specifications. When it does, the telephone number of a public utility data processor is read out if the telephone line to the local station is then idle. When the data processor replies, a meter reads out its existing setting. If the line is or becomes busy before all information is fed into the data processor, the station equipment goes into a waiting condition until the line again becomes idle. Calls are then placed repeatedly during idle conditions until a complete block of information is sent out and an acknowledgement signal is received from the data processor.

ENCODER TRANSPONDER

ENCODER TRANSPONDER FIG 1

Figure 1:
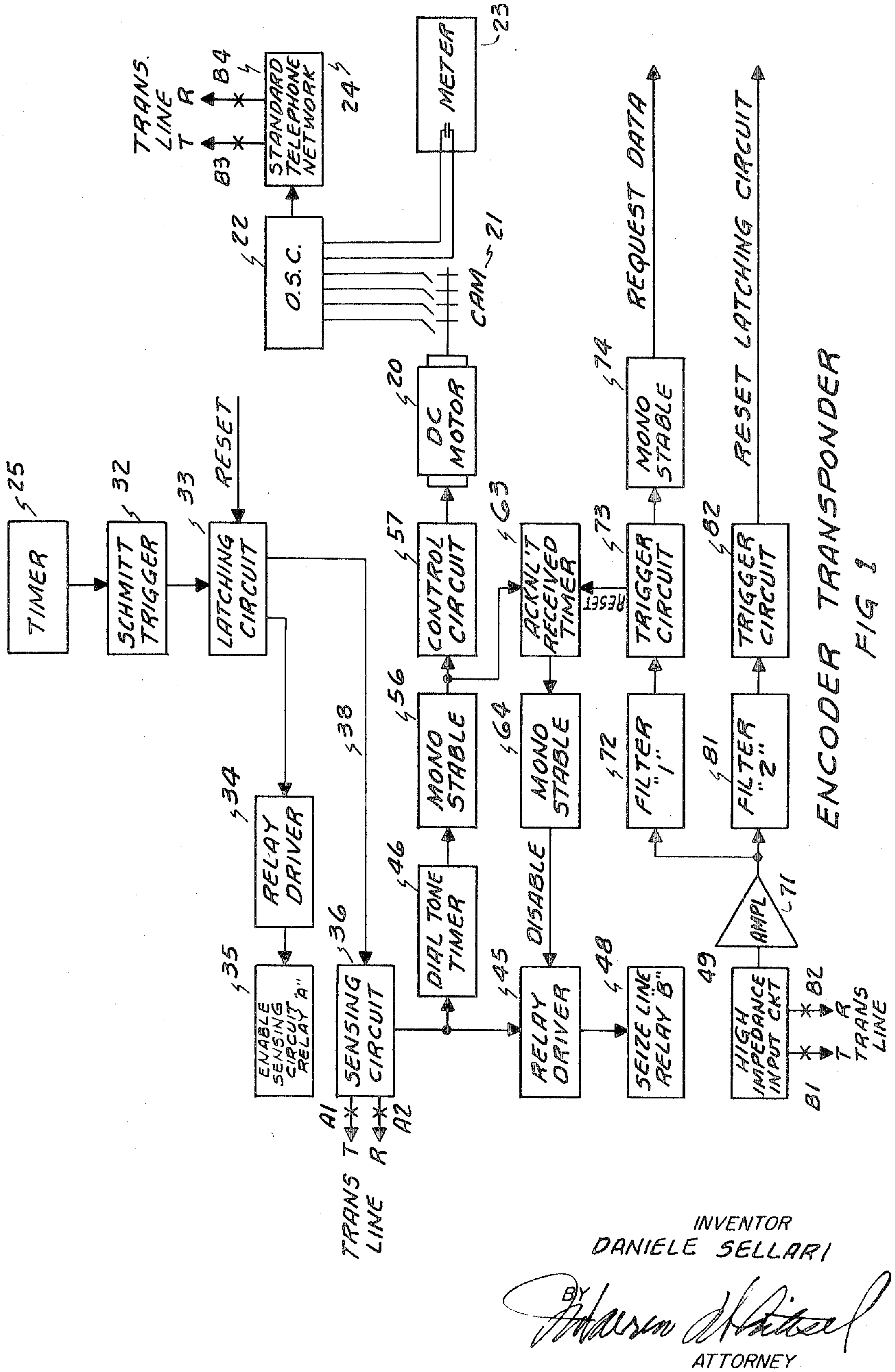

INVENTOR
DANIELE SELLARI

BY [signature]
ATTORNEY

AUTOMATIC REMOTE METER READING OVER TELEPHONE LINE

This invention relates to attachments for telephone lines and more particularly—although not exclusively—to automatic meter reading attachments.

For many years, there was an erroneous belief that so-called foreign attachments could not be connected to telephone lines. Thus, although there are patents and literature describing such things as remote meter reading attachments, there never has been any serious attempt to design or use them.

Recently, certain governmental and industry regulations, agreements, and specifications have made it possible to connect such foreign attachments to telephone lines. Obviously, these regulations, agreements, and specifications have opened a vast new market since a 50 billion dollar communication network is now available for purposes other than serving the traditional telephone communication needs. Thus, there is an immediate and pressing need for interface equipment which can join the new equipment to the existing telephone lines. Obviously, the interface must insulate the lines form adverse effects if the attachment becomes faulty or otherwise tends to needlessly tie up the central office equipment.

The description which follows, speaks of electric meter reading equipment in order to provide a concrete example of how the inventive interface equipment may connect one particular foreign attachment to a telephone line. However, it should be understood that the invention is not limited by this specific reference to a meter. The may be used in connection with any attachments which may require the inventive capabilities.

A few of these capabilities may be described in somewhat the following manner. Automatic sensors usually avoid human errors. The equipment may call in the sensor readings regardless of the inaccessible of an area and without regard for such things as weather, customer presence, and the like. Accurate information may be fed from the sensors directly into data processing equipment. On the other side, the foreign sensor attachments must be compatible with existing equipment and must not interfere in any manner with normal communications. It should be a very low-cost item since equipment at the station end of the line is the most numerous items in the entire communication, or public utility network. Although some party line economics may be realized, there is no real chance to reduce cost by sharing subscriber equipment, as there would be if the equipment were more centrally located. The sensor and associated telemetering equipment must be very accurate. It should be trouble-free with almost no maintenance required. Moreover, the local sensor or meter should always identify itself since this is the information that is important to the public utility company. The information should not depend upon telephone numbers which could be reassigned when a party moves. If the local subscriber station should go off-hook at any time during the telemetering operation, the subscriber must regain complete and immediate control over the line. Obviously, many other considerations, objectives, and design factors could also be cited.

Accordingly, an object of this invention is to provide new and improved interface equipment for connecting foreign attachments to telephone subscriber lines. More particularly, an object is to provide equipment for periodically placing telephone calls to remove data processing equipment and transmitting locally generated information thereto. In this connection, an object is to periodically—such as once every 2 to 4 weeks—phone in a meter reading to centrally located billing equipment.

Another object is to provide means for using telephone lines to connect peripheral equipment to a central data processor.

Yet another object is to provide low-cost, trouble-free, reliable equipment which does not interfere with normal telephone service.

In keeping with an aspect of this invention, these and other objects are accomplished by local data transmitting terminal equipment which is periodically triggered into operation, such as once every 2 to 4 weeks; although, any suitable time period may be used. Once triggered, the local data terminal conducts a busy test to determine whether the line is or is not in use. If the line is in use, the terminal goes into a holding condition. If it is idle, or soon as it becomes idle, the local data transmitting terminal automatically reads out a telephone number which sets the central office switching equipment to seize and signal the central data processor at a public utility headquarter location. Thereafter, a sensor at the terminal reads out any locally stored data. If the subscriber station goes off-hook to place a normal telephone call, the local data terminal immediately releases itself from the telephone line. When the line is again free, the local data transmitting terminal immediately places another call. The process continues until the local terminal finishes the transmission of a complete block of information. Then, the terminal releases until it is again triggered into operation several weeks later.

Figure 2:
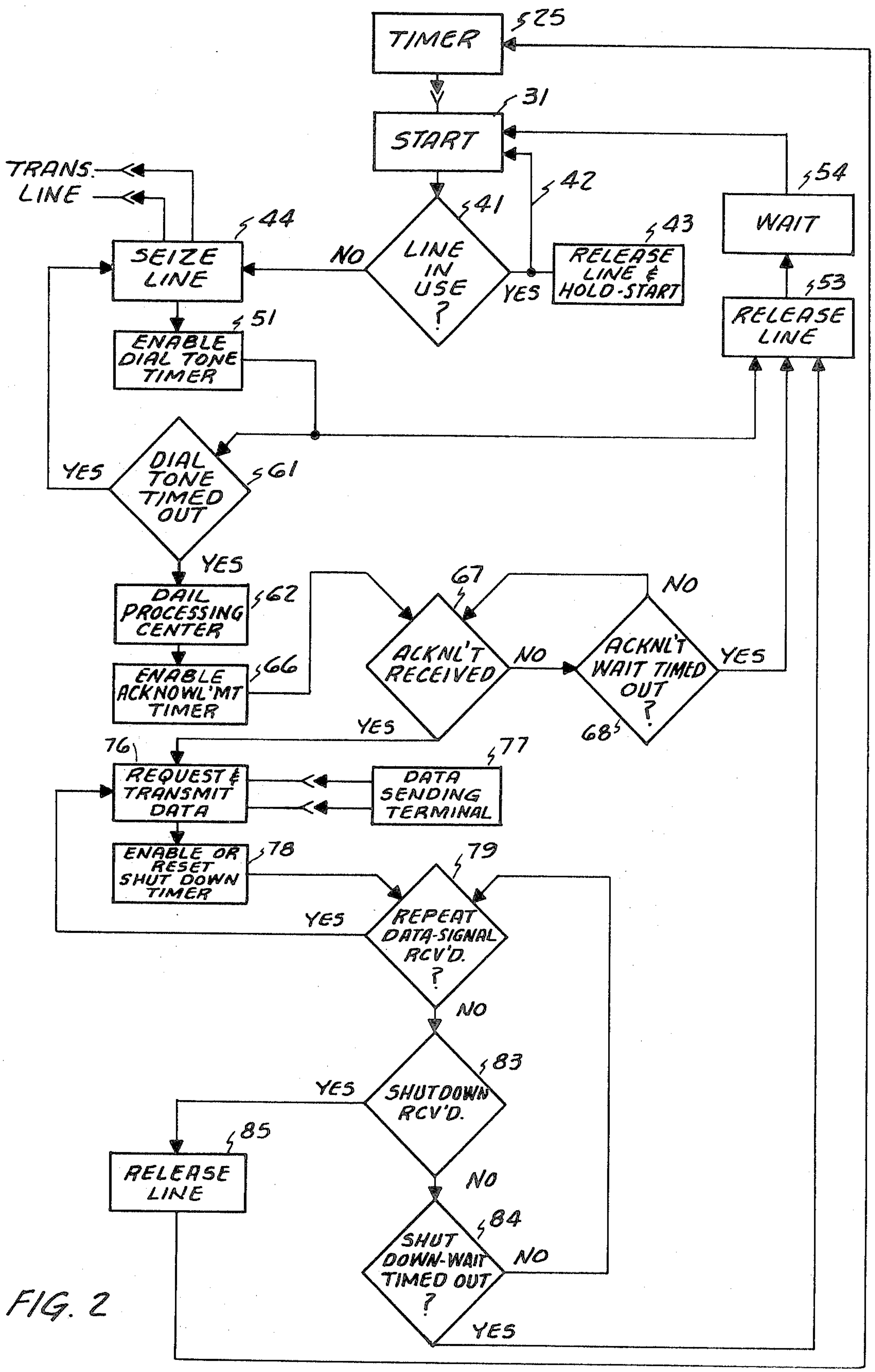

The above-mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram of an encoding transponder of a local data transmitting terminal, at the subscriber station, adapted to send data to a public utility office; and FIG. 2 is a logical flow chart showing how the station equipment of FIG. 1 operates.

All of the equipment shown in FIG. 1 is located on the subscriber's premises and connected to his telephone line. The telephone line is shown at three different locations, each drawing location being identified by the words "TRANS. LINE" and the letters T and R which refer to the well known tip and ring conductors. The only reasons for using these three locations is to keep the drawing simple. The entire unit may be powered from the central office telephone battery; however, a local power supply is preferred.

A DC motor 20 drives a series of cams 21 to send the telephone number of a central data processor which may be located at a public utility office, for example. While these cams may be cut to send the well-known DC dial pulses, they are here shown as being arranged to key an oscillator 22 of the type used in pushbutton dials.

The local sensor or other data collector, meter 23, is any suitable device for sending telemetering signals responsive to local conditions. In one particular instance, it is thought that an electric meter made by the Westinghouse Electric Corporation will be used.

The network 24 may be any suitable device for terminating and balancing a telephone line. It is thought that the standard network from a conventional telephone set will prove suitable for most installations. However, some telemetering equipment may impose limitations which require special circuit designs, but the design of such a special network is within the present state of the art.

The timer 25 is any device which is triggered whenever a meter readout is required. In one embodiment, a 2 to 4 week cycle is anticipated according to user needs. Usually, the timing is not too critical since customer billing is by the month. Hence, relatively wide tolerance specifications may be used.

For example, an electrochemical timing device is now available from the Bissett-Berman Company to control timing circuits running 12 days or longer. One timer unit, looks like a small tantalum capacitor about three-fourths of an inch long and contains two electrodes separated by a column of electrolyte. Silver, deposited at one electrode, is moved through the electrolyte at a low current to the other electrode. When all silver has been so moved, the current stops. Then, after the first timing cycle, the current is reversed, and the silver is carried back to its starting point. If the voltage remains constant, the return cycle takes exactly as long as the first timing cycle. One such cell and a flip-flop can provide an extremely compact, low-current, recycling timer adjustable for a cycle of a few weeks.

The remaining components in FIG. 1 are known devices which will be understood from a description of their operation. For this part of the description, reference may be had to the flow chart of FIG. 2.

After the timer 25 times out, a start signal 31 (FIG. 2) is sent to operate a Schmitt trigger circuit 32 (FIG. 1). The Schmitt trigger 32 operates a latching circuit 33 which does not release until after all telemetered equipment has been successfully sent to and acknowledged by a central data processor. Thus, the subscriber may use his phone as much as he wishes without destroying the memory of the timeout signal.

The latching circuit 33 operates an electronic relay driver circuit 34 which energizes an "A" relay, 35. The "A" relay closes its contacts A1, A2 to connect a sensing circuit 36 to the subscribers telephone line conductors T and R for detecting busy and idle conditions on the line. The circuit 36 may include an extremely high input impedance circuit, such as a Darlington circuit, driving a well-known trigger circuit, such as a Schmitt trigger. Because of the high input impedance, the sensing circuit has no effect upon the line. Thus, logically (FIG. 2), the sensing circuit 36 asks the question 41, "Is the line in use?" This condition will continue until the sensing circuit 36 detects an idle line.

When the sensing circuit 36 detects an idle line, it goes into a line seize mode of operation 44 by enabling a relay driver 45 and starting a dial tone timer 46. A "B" relay operates and closes contacts B1, B2 and B3, B4 to connect a high impedance circuit 49 and the network 24 across the tip and ring conductors T and R. This bridge is a closed loop seizure signal to the central office equipment which replies in an entirely conventional manner by sending dial tone. Logically, this is shown on the flow chart by a dial tone timer enable 51, which waits for 3 seconds before allowing dialing the processing center.

After this wait period for dial tone, a monostable circuit 56 is triggered an unstable condition which lasts long enough to insure proper dialing. This monostable output causes a control circuit 57 to drive the DC motor 20, during the unstable period of the monostable circuit 56. As the motor turns its cams 21, the circuit 22 sends out, via network 24, the telephone number which identifies the data processing center at the public utility headquarters. Logically (FIG. 2), this is shown as the decision at 61 for causing the number to be sent at 62. The dial pulser also triggers an acknowledgement timer 63 which measures a period of time during which a connection must be completed to the data processing center. When the data processing center receives the call, its answer supervision circuit (not shown) causes an acknowledgement signal to return over tip and ring conductors T and R, to the circuit 49. The invention contemplates the return of an audiofrequency acknowledgement signal which should arrive within a predetermined period (such as 10 seconds) following transmission of dial tone.

If an acknowledgement signal is not received before the timer 63 times out, the line seize circuit 49 is released and operated again to place a new call. In greater detail, the monostable circuit 56 triggers an acknowledgement timer 63 that measures a period of time which includes the operation of the DC motor 20. If circuit 63 times out, a monostable circuit 64 is triggered to inhibit and disable the relay driver 45. This releases "B" relay 48 to open contacts B1, B2 and B3, B4. When the "B" contacts open, the bridge 49 is removed from the line, and the central office equipment releases. This is shown at 66 in the logic flow chart where the enable acknowledgement timer 63 measures a period of time while it asks the question 67, "Has the data processing center replied?" If the answer is "no," the equipment waits at 68 for timeout. Then, the line is released, and the recycle occurs again, as logically shown at 53, 54.

If the acknowledgement tone does arrive before the timer circuit 63 times out, it is amplified at amplifier 71, passed by filter 72, and operates trigger circuit 73. The timer 63 is reset by the output of the trigger circuit 73. The output of trigger circuit 73 also causes a monostable circuit 74, which is ample time for the telemetering process. If the data processing center is not satisfied with the telemetered signal it receives, it resends the acknowledgement signals any number of times to retrigger the circuit 73, and reset the timer 63, thereby causing a retransmission of the telemetered data. Logically, this is shown in FIG. 2 where the acknowledgement circuit 66 triggers a data transmit circuit 76. Thereupon, the data sending terminal is enabled, and a timer 78 (this timer 78 is actually timer 63 which has been reset) is triggered. If a repeat signal 79 is received, the data request 76 is again triggered, and data is retransmitted.

When the data processing center has received a valid block of telemetered signals, it returns a different audiofrequency tone which is amplified at 71 and filtered at 81. If this tone fails to arrive before the timer 63 operates monostable 64, then the line is released and the recycle occurs again as logically shown at 53, 54. A trigger circuit 82 operates to release the local equipment, by resetting the latching circuit 33. Thereafter, nothing further occurs until several weeks later when the timer 25 again triggers the transmission of data. In FIG. 2, this is logically shown as a decision block 83 which maintains a shutdown timer 84 until the shutdown signal (Filter 2 frequency) is received. Before the, the decision circuit 84 holds the logic condition 79 so that the telemetered data may be repeated. When the shutdown signal 83 is received, the line is released (as indicated at 85) to reset timer 25. The circuit is now standing ready to receive the next signal from timer 25.

If, the local subscriber station should go off-hook at any time during the telemetering operation, the sensing circuit 36 releases the "B" relay 48. The contacts B1, B2, and B3, B4 open immediately, and the subscriber preempts service and regains full and complete control over the line. Thus, the release time of a relay (about 500 milliseconds) is the longest that the subscriber line would be out of normal telephone service. The subscriber could not detect this. Insofar as called service is concerned, the calling subscriber would receive a busy tone during telemetering. However, the entire data transmission operation is completed very quickly and the line would not be busy during the next call attempt. Thus, the effect is not too much different from the situation where busy tone is returned when a switch path is blocked by overflow conditions in a network. Again, this blocked call is a normal telephone service situation.

An important advantage is that the telemetered data is sent responsive to the sensor initiative. The meter location always calls the processor and identifies itself. This "geographical" location is the information that is important to the public utility company. The meter identification information does not depend upon telephone numbers which are called from the processor. Those numbers could be reassigned when a party moves, and the public utility electric company data processor would not be aware of the new meter condition. Still other advantages will occur to those who are skilled in the art.

While the principles of the invention have been described above in connection with specific apparatus and applications, it is to be understood that this description is made only by way of example and not as a limitation on the scope of the invention.

I claim:

1. A telemetering sensor data transmitting terminal connected to the subscriber end of a telephone line, said terminal comprising means for repeatedly measuring predetermined periods of time and then triggering a readout cycle at the end of each measured time period, means responsive to the triggering of said cycle for transmitting a predetermined telephone number over said subscriber line, and means responsive to the completion of a connection to a station identified by said predetermined telephone number for sending data from said sensor over said telephone line.

2. The terminal of claim 1 wherein said timer means measures a period of approximately 2 to 4 weeks between each triggering of a readout cycle.

3. The terminal of claim 1 wherein the sensor is a public utility meter and said data is the setting of said meter at the time of said readout.

4. The terminal of claim 1 and means responsive to the seizure of said telephone line from a station connected to said line for preempting service from said data transmission terminal.

5. The terminal of claim 1 and means responsive to said triggered readout for holding said transmitting terminal in a latched condition, and means responsive to an acknowledgement signal from said station identified by said telephone number for releasing said latched condition.

6. The terminal of claim 5 and means responsive to said latched condition for repeatedly attempting to readout said data until said acknowledgement signal is received.

7. The terminal of claim 1 and means responsive to the triggering of a readout cycle for monitoring said subscriber line for busy or idle conditions on said line, and means responsive to the detection of a busy condition for inhibiting said terminal, thereby giving telephone service the preemptive right-of-way over said data transmitting terminal.

8. The process of data transmission comprising the steps of:

a. repeatedly measuring predetermined periods of time and latching a hold condition responsive to the end of said time period, b. testing a telephone line for busy or idle conditions at the end of each measured time period, c. calling a central data processor when said line tests idle after the end of each measured time period, d. transmitting locally generated data to said central data processor responsive to a completion of said call to said processor, and e. releasing said latched holding condition responsive to the complete transmission of all data.